Aug. 19, 1958 — R. L. PATE — 2,847,933
TORTILLA HOLDER
Filed Oct. 5, 1956
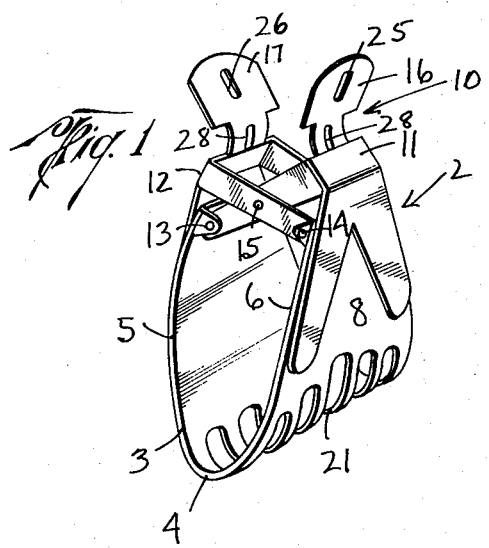
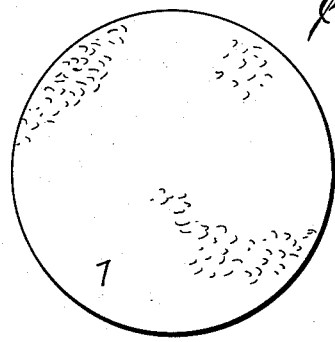
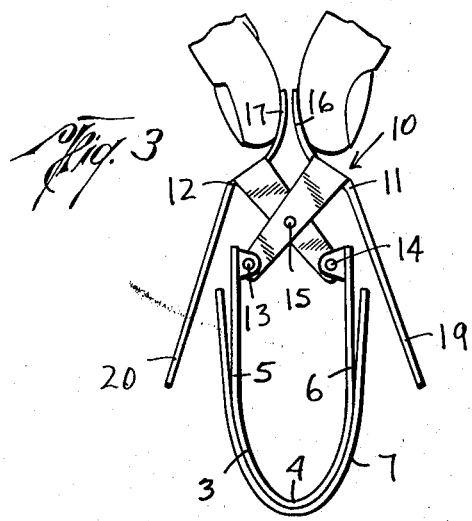
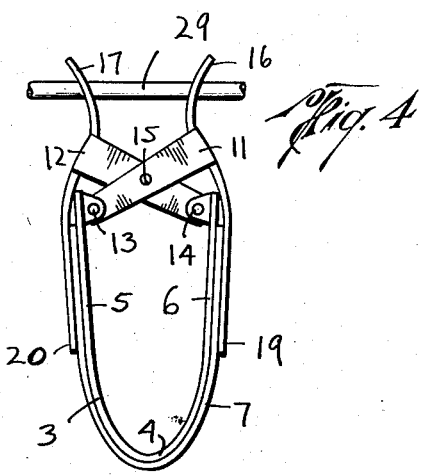
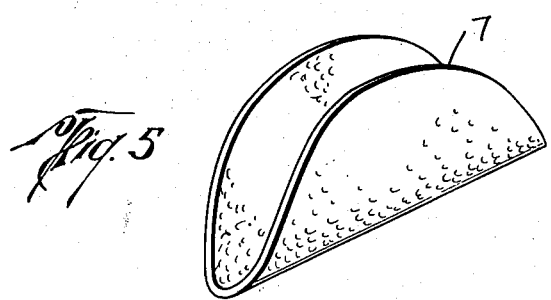
Rayford L. Pate
INVENTOR.
BY Hayden & Pravel
ATTORNEYS

United States Patent Office 2,847,933
Patented Aug. 19, 1958

2,847,933

TORTILLA HOLDER

Rayford L. Pate, San Antonio, Tex.

Application October 5, 1956, Serial No. 614,217

2 Claims. (Cl. 99—426)

The present invention relates to a tortilla holder for forming the tortilla into a desired shape.

Various devices have been proposed for holding tortillas so as to form them during cooking into a desired shape or shell whereby they may be used for tacos and the like. All of such prior devices embodying constructions wherein the holder necessitates cooking the tortilla in deep-fat. While such arrangement is entirely practical in commercial establishments, where the volume warrants the use of such apparatus, quite often it is desirable to prepare the tortillas into shells on a much smaller scale, such as in the home.

In some circumstances, it is desirable to provide a holder for the tortilla which will form it into the proper shape for use in tacos and the like, but which holder may be used in other than deep-fat frying.

The present invention provides a holder for a tortilla whereby the tortilla may be cooked in a frying pan and formed into a suitable shape shell for use in tacos and the like. Of course, the present invention may be used in deep-fat frying if desired, but the arrangement and construction of the invention and the cooperative function of the component parts is such that it readily lends itself to use in home cooking where it may be desired to prepare the tortilla in a frying pan.

Still another object of the present invention is to provide a tortilla holder wherein a tortilla may be quickly and easily positioned thereon for holding it as it is being cooked to form it to a desired shape, and which construction permits ready removal of the tortilla from the holder after cooking thereof.

Other objects and advantages of the present invention will become readily apparent from a consideration of the following description and drawings wherein:

Fig. 1 is a perspective view illustrating the holder of the present invention;

Fig. 2 is a top plan view of a tortilla;

Fig. 3 is an end view of the holder illustrated in Fig. 1 showing the clamp means in expanded position with the tortilla of Fig. 2 positioned thereon;

Fig. 4 is an end view somewhat similar to Fig. 3, but showing the clamp means in position retaining the tortilla on the holder; and Fig. 5 is a perspective view showing the tortilla after it has been cooked.

In Fig. 1 the invention is designated generally by the numeral 2 and is shown as including a plate 3 of suitable configuration and size so as to accommodate any size tortilla thereon. The support plate 3 is shown as being bent at its widest portion as illustrated at 4 so as to form the general U-shape as shown in the drawing with the legs 5 and 6 of such U-shaped plate providing a tortilla engaging surface, whereby the tortilla illustrated at 7 may be positioned on the outer surface 8 of the plate 3. As previously mentioned, the configuration of the plate is not critical and it may be of any suitable form such as circular, or any other suitable shape as desired, so long as it presents a surface 8 large enough to accommodate the tortilla which is to be cooked.

It is desirable to provide some mechanism or means for retaining the tortilla 7 in position on the U-shaped plate 3 as it is being cooked and to accomplish this function, clamp means illustrated generally by the numeral 10 are provided. The clamp means 10 is shown as including projections 11 and 12. It will be noted that the projection 11 is pivotally secured at 13 to the leg 5 of the U-shaped plate which is opposite from the projection 11. Similarly, the projection 12 is pivotally secured as illustrated at 14 to the leg 6 of the U-shaped plate 3 which is in opposed relation to the projection 12. The projections 11 and 12 are pivotally secured together as illustrated at 15 and include upwardly extending portions 16 and 17 which portions are adapted to be engaged by any suitable means so that when the portions 16 and 17 are moved toward each other as illustrated in Fig. 3 of the drawings, the legs 5 and 6 of the U-shaped support or base plate 3 are pulled towards each other and the portions 19 and 20 of the projections 11 and 12 which extend over the legs 6 and 5, respectively, move outwardly relative to such legs whereby the tortilla illustrated at 7 may be positioned on the support plate 3 or may be removed therefrom. The projection 11, as well as the projection 12, are provided with pivotal connections 13, 14 and 15 on the other side so as to aid in providing a construction which is sturdy and will withstand the use to which it is adapted to be put. The spaced pivotal arrangement of the projection 11 on the leg 5 and the spaced pivotal arrangement of the projection 12 on the leg 6 of the U-shaped member 3 affords a construction which is well balanced whereby the tortilla 7 may be quickly and easily positioned on the plate 3 or may be quickly and easily removed from its position on the plate after cooking.

While it is believed that the operation of the foregoing invention is understood from the previous description, it will be assumed that the tortilla 7 is to be positioned on the holder of the present invention for cooking in a frying pan to form it into a tacos shell.

It will be noted that the base plate or support plate 3 is provided with a plurality of grooves 21, which grooves provide a means whereby the tortilla may be uniformly cooked while it is being held in the holder in a frying pan, such holes also serving as a means of egress for the grease from the tortilla and the holder after the tortilla has been cooked and as it is being removed from the frying pan.

In order to position the tortilla 7 on the holder of the present invention, it is only necessary to grasp the portions 16 and 17 of the clamp means 10 between the forefinger and thumb and the tortilla 7 may then be wrapped around the base or support plate 3 so that the tortilla is supported on the outer surface 8 of such plate and on each of the legs 5 and 6. The clamp means 10 may then be released whereupon the resiliency in the base or support plate 3, as well as the pivotal arrangement of the projections 11 and 12 relative to each other, as well as relative to the legs 5 and 6, causes the projections 11 and 12 to move inwardly to engage against the tortilla to hold it on the support 3 as more clearly illustrated in Fig. 4 of the drawings. The construction of the present invention is such that the tortilla may be cooked in a frying pan, thus eliminating the necessity for using a large amount of grease or fat, as is required with prior art devices which are designed for deep-fat frying. After the tortilla has been cooked, it may be removed from the holder 3 by again engaging the upstanding portions 16 and 17 with any suitable means such as the fingers, or an instrument. By collapsing the portions 16 and 17 toward each other, the portions 19 and 20 of the projections 11 and 12 move outwardly relative to the legs 5 and 6, whereupon the tortilla 7 may be removed therefrom. After it has been cooked it assumes the permanent form as illustrated in Fig. 5 of the invention.

From the foregoing it can be appreciated that a relatively simple construction is provided for quickly and easily positioning the tortilla on the holder of the present invention and for easy removal thereof after it has been cooked. Suitable openings 25 and 26 may be provided in the portion 16 and 17, as well as openings 28 for engaging the holder of the present invention by any suitable means such as a fork or the like to turn it over in the skillet or to remove it therefrom if desired. Additionally, the present invention may be used in commercial establishments, or where it is desired to prepare a large number of tortillas into tacos shells simultaneously by inserting suitable means such as a rod 29 through the openings 25 and 26 whereupon the device can be used to cook tortillas by placing them in a large amount of fat.

Broadly the present invention relates to a tortilla holder and more particularly to a tortilla holder which includes means for retaining the tortilla on the holder which means may be quickly and easily actuated to effect release of the tortilla from the holder after it has been cooked.

What is claimed is:

1. A holder for cooking a tortilla to form an edible shell for tacos and the like including, a base to support the tortilla while it is cooking, said base being substantially U-shaped and forming a tortilla support on the outer surface thereof, and means pivotally secured to said base for engaging the tortilla on said base and pivotally movable away from said base to facilitate removal of the tortilla after cooking, said last named means including projections pivotally secured on each side of said base and extending over the portion of said U-shaped base which is in opposed relation thereto, said projections being pivotally secured together at a position above their pivotal connection to said base, upwardly extending portions on each of said projections which are adapted to be moved toward each other to move said projections away from said base whereby the tortilla may be moved from said base.

2. A holder for cooking a tortilla in a frying pan to form an edible shell for tacos and the like including, a substantially U-shaped support plate having a surface large enough to accommodate a tortilla thereon, clamp means engaging the tortilla against said plate for holding and forming it as it cooks, said means including projections secured to each leg of the U-shaped plate and extending over the tortilla engaging surface of the opposite leg for holding the tortilla on the U-shaped plate, said projections being pivotally secured together between the legs of said U-shaped member, portions secured to and upwardly extending from each of said projections whereby said projections may be pivotally moved relative to said support plate and the tortilla thereon whereby the tortilla may be removed from its position on said plate.

References Cited in the file of this patent

UNITED STATES PATENTS

| | | |
|---|---|---|
| 692,262 | Geering | Feb. 4, 1902 |
| 2,775,929 | Johnson et al. | Jan. 1, 1957 |